Jan. 27, 1970    J. H. SHIVERDECKER ET AL    3,491,506
ALTERNATE STATION CONTAINER FILLING AND SEALING SYSTEM
Filed Jan. 30, 1968    8 Sheets-Sheet 1
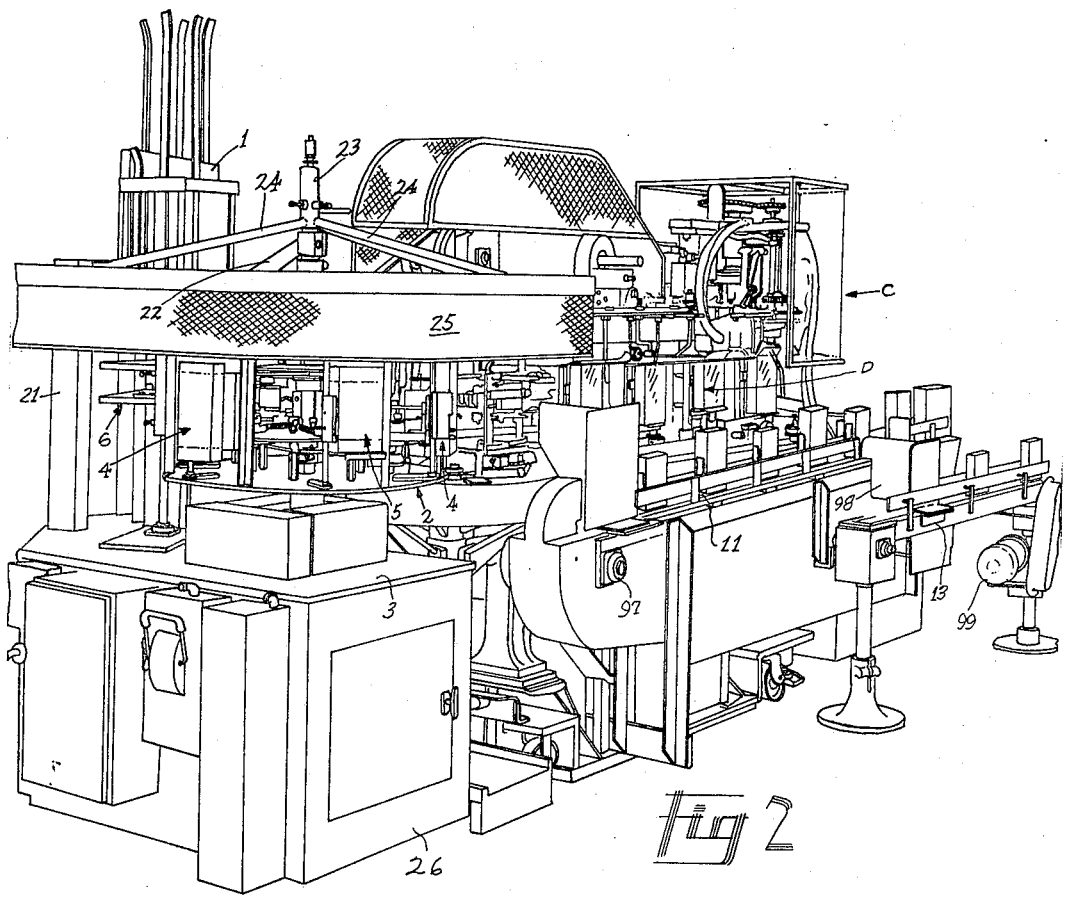
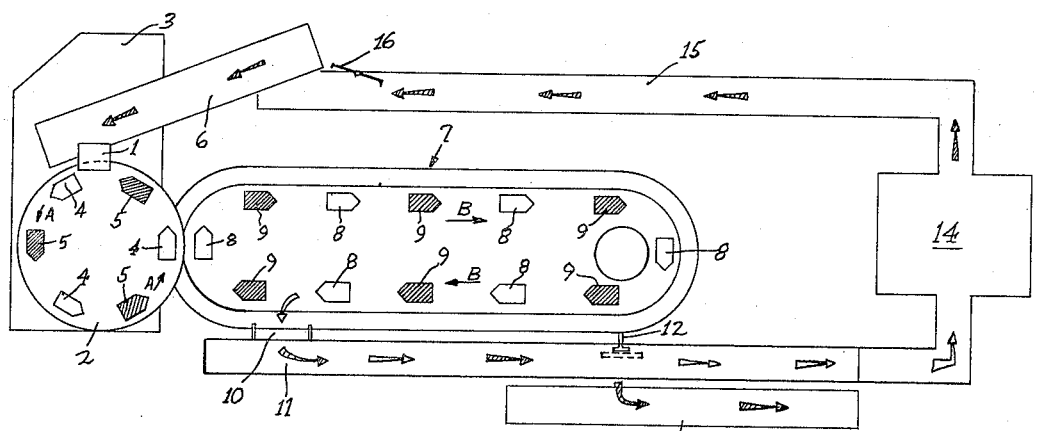
INVENTOR/S
JAMES H. SHIVERDECKER &
AUGUST KUND,
BY *Melville, Strasser, Foster and Hoffman*
ATTORNEYS

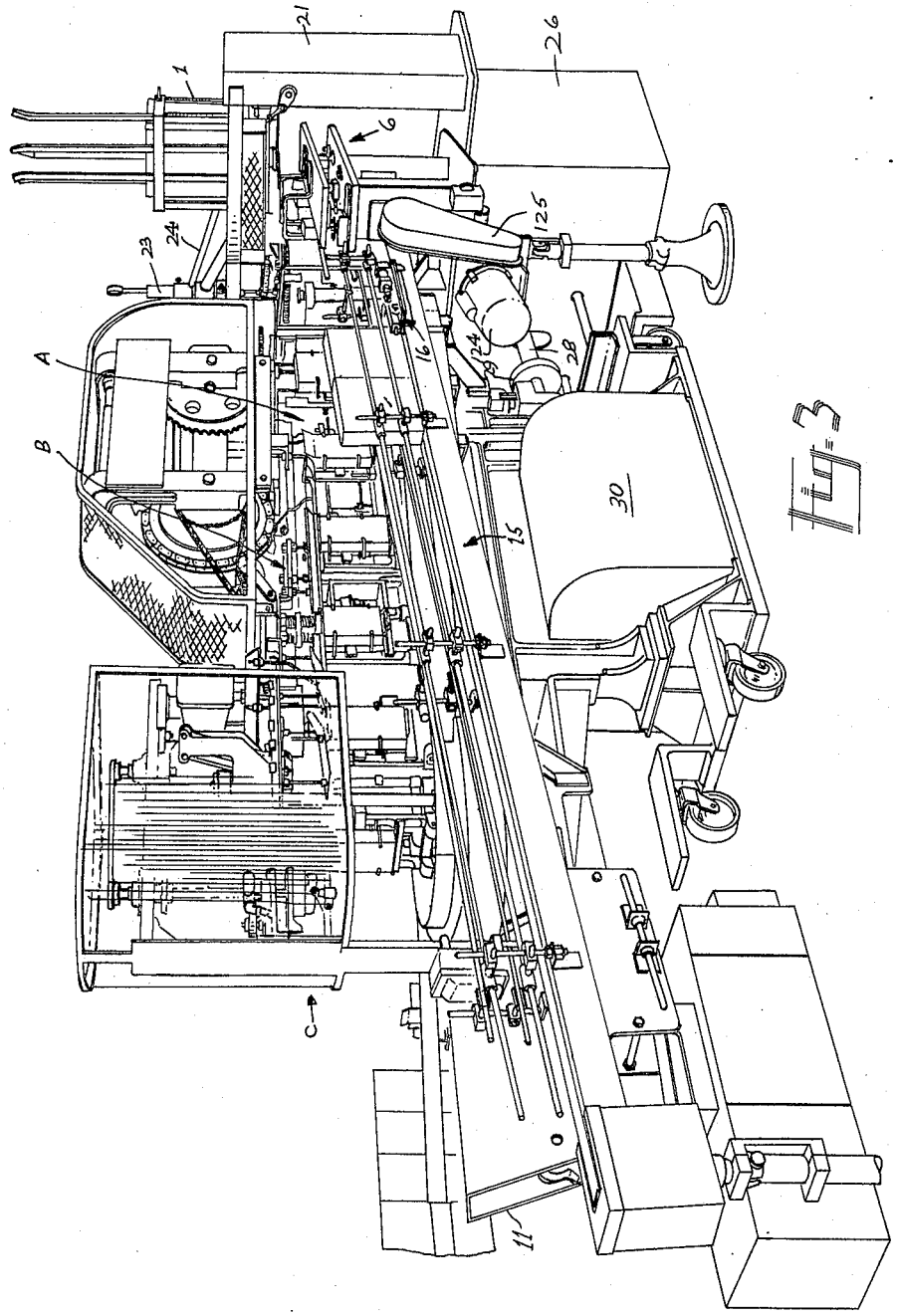

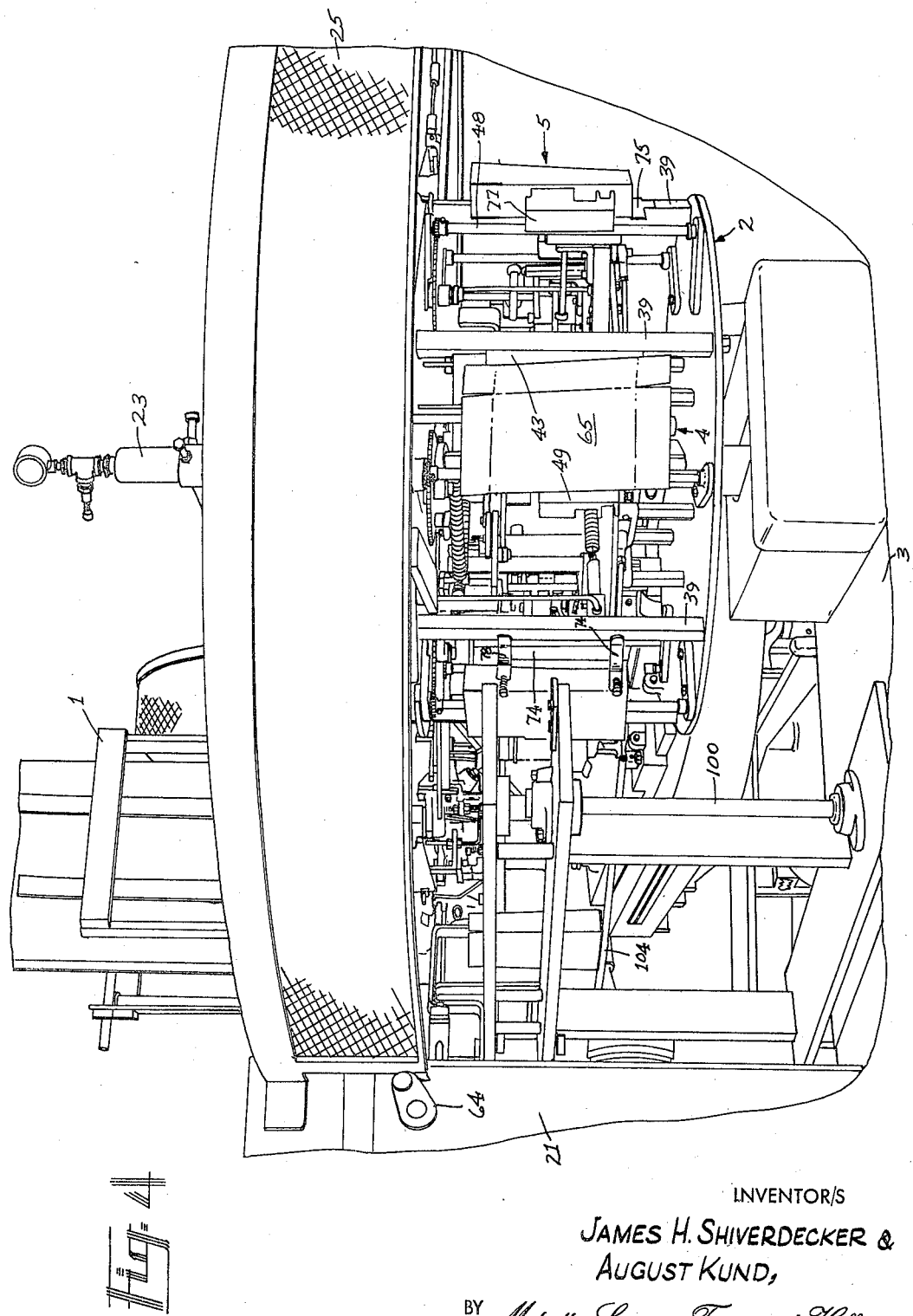

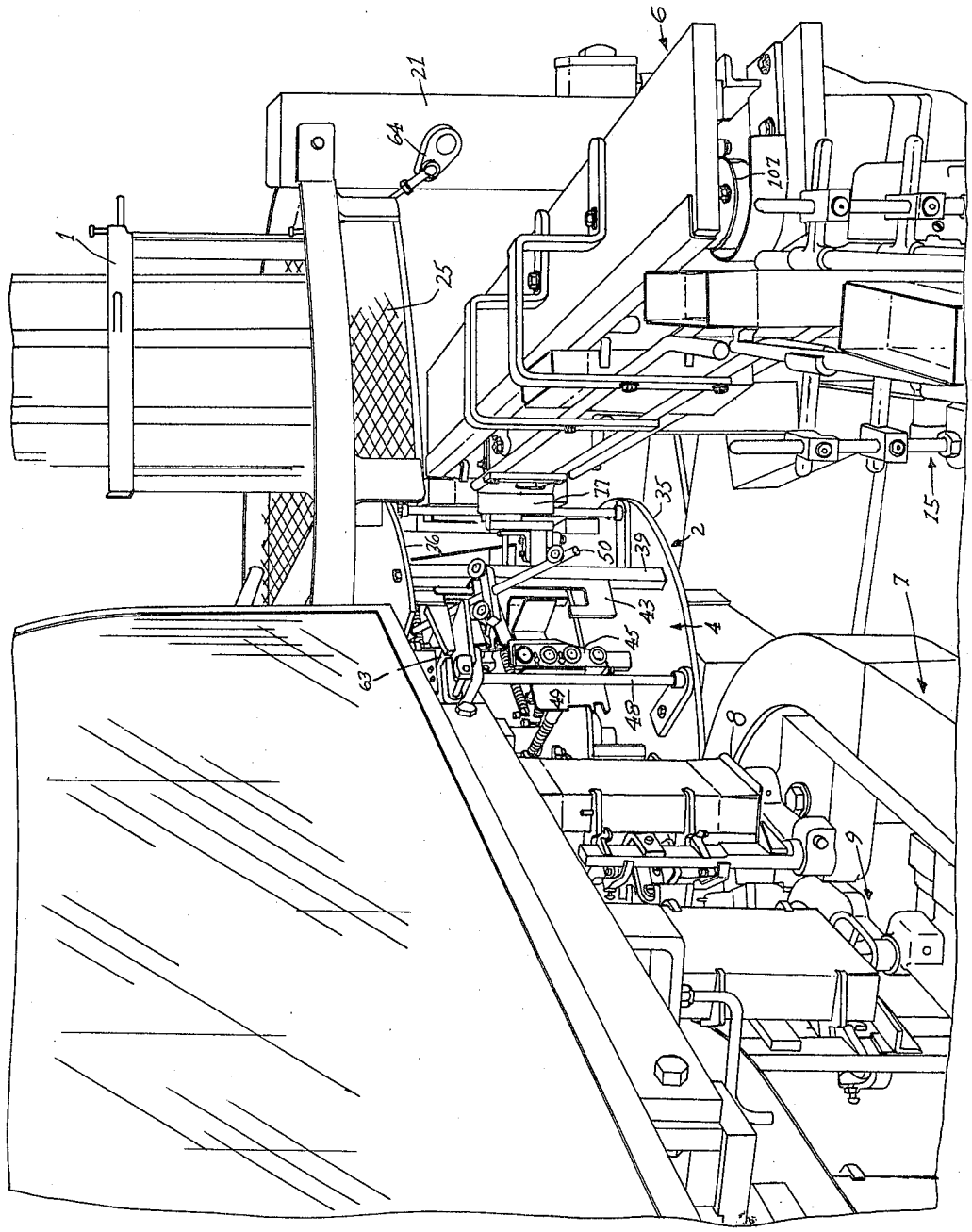

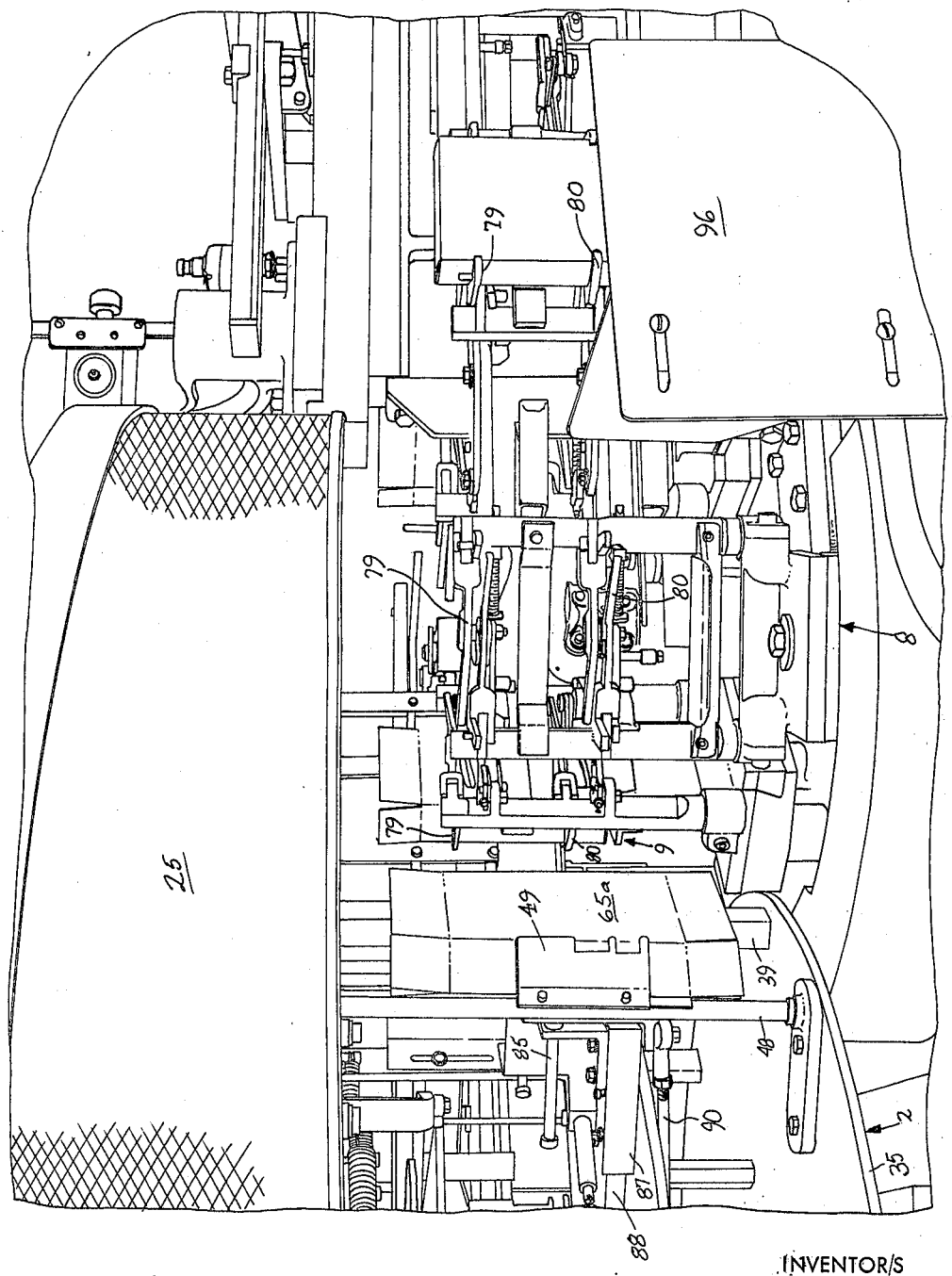

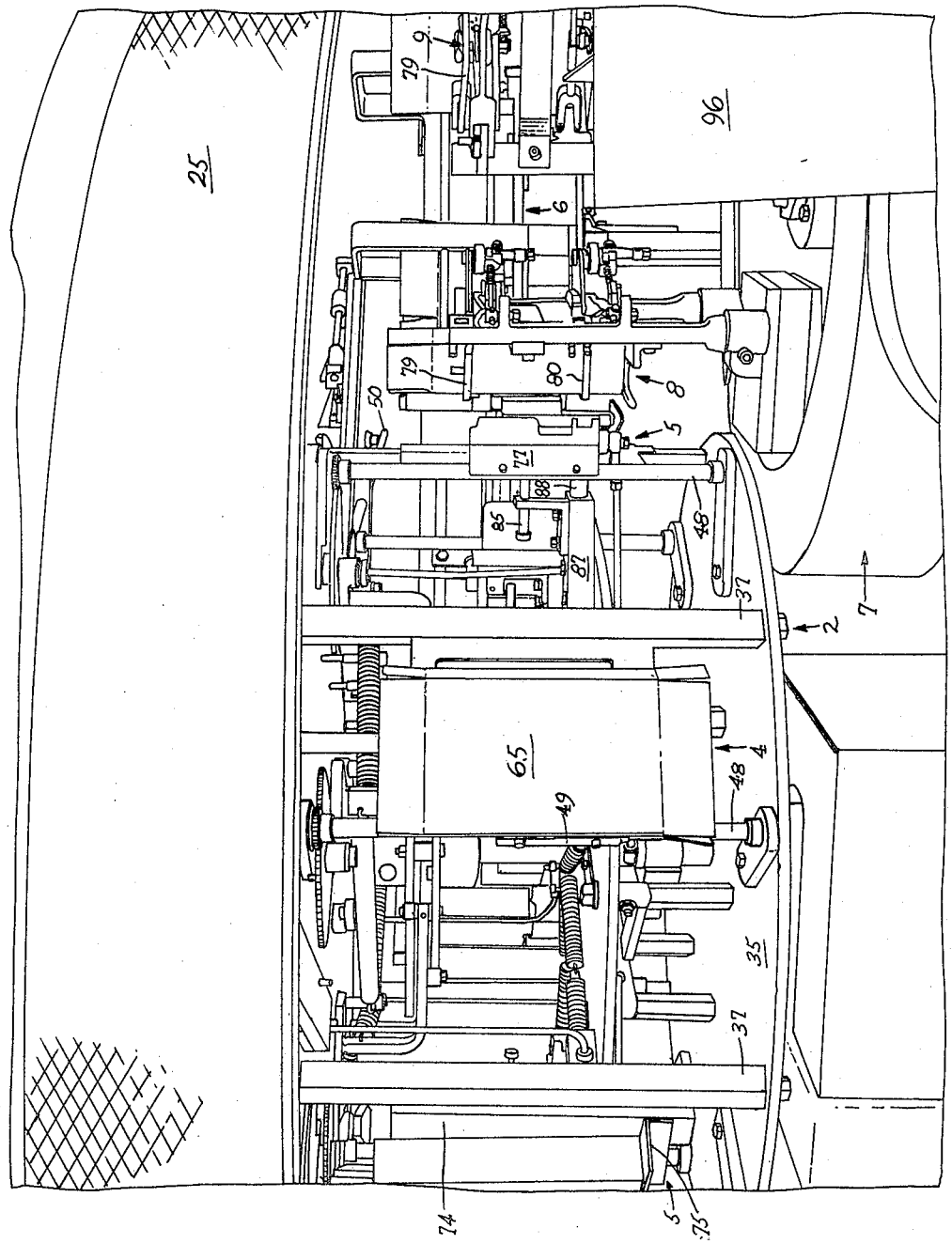

Jan. 27, 1970   J. H. SHIVERDECKER ET AL   3,491,506
ALTERNATE STATION CONTAINER FILLING AND SEALING SYSTEM
Filed Jan. 30, 1968   8 Sheets-Sheet 7
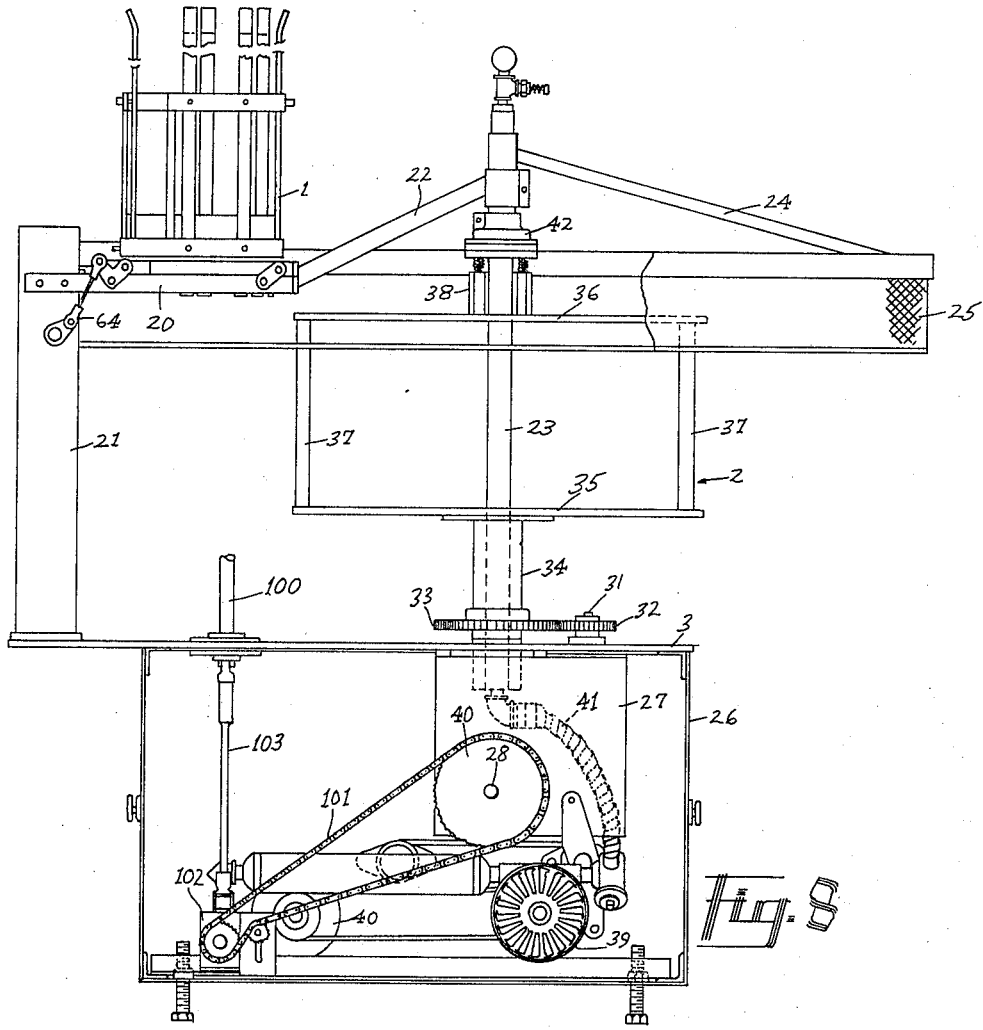
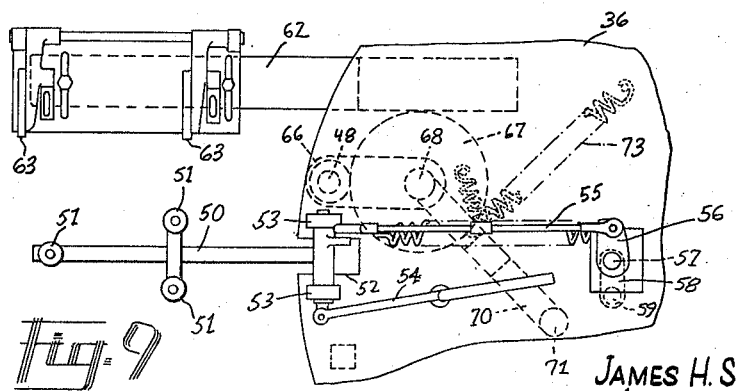
INVENTOR/S
JAMES H. SHIVERDECKER &
AUGUST KUND,
BY *Melville, Strasser, Foster and Hoffman*
ATTORNEYS

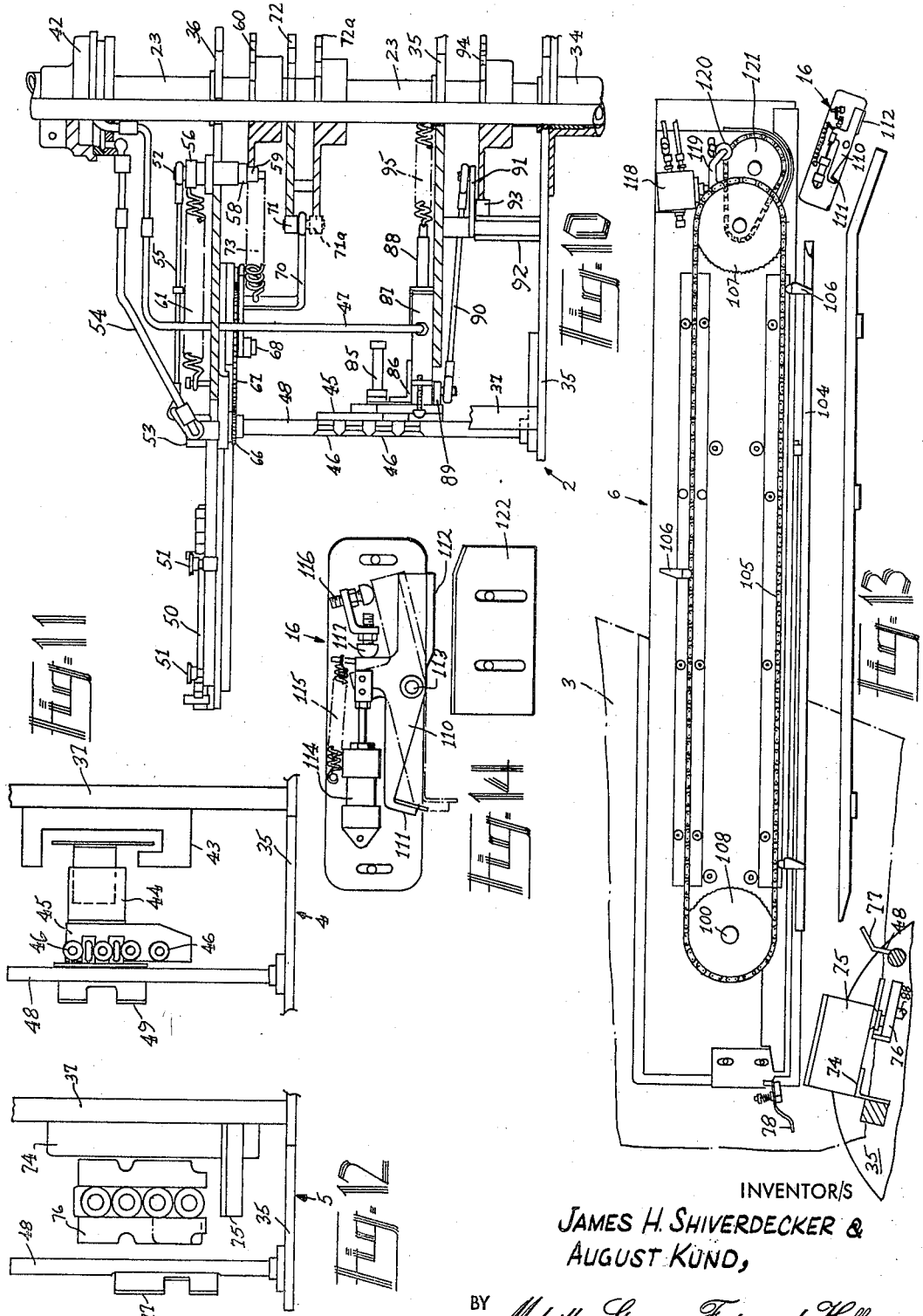

United States Patent Office 3,491,506
Patented Jan. 27, 1970

3,491,506
ALTERNATE STATION CONTAINER FILLING AND SEALING SYSTEM
James H. Shiverdecker, Trenton, Ohio, and August Kund, Glendale, Calif., assignors to The Bergstein Packaging Trust, Middletown, Ohio, a trust
Filed Jan. 30, 1968, Ser. No. 701,782
Int. Cl. B65b 43/26
U.S. Cl. 53—29      13 Claims

ABSTRACT OF THE DISCLOSURE

An integrated system for converting flat-folded container blanks, whether liner or unlined, into completely closed and sealed packages, the flat-folded container blanks being erected, closed and sealed at one end, inverted, filled with contents, and then closed and sealed at their remaining ends, all in a continuous system incorporating a single turret feeding mechanism which alternately feeds unsealed containers and containers closed and sealed at one end only to a single closing and sealing mechanism which alternately receives unsealed and sealed at one end containers and performs a closing and sealing operation thereon, thereby providing an integrated packaging system in which the same basic container feeding mechanism and container closing and sealing mechanism is utilized to convert flat-folded container blanks into erected and completely sealed packages.

BACKGROUND OF THE INVENTION

In Bergstein Patent 2,277,289, patented Mar. 24, 1942, there is disclosed a packaging machine wherein the lined containers to be closed and sealed are delivered to carriages which advance the containers through a series of operating stations at which the extending liner mouths and end flaps at one end of the containers are folded and sealed, whereupon the containers are discharged from the device. The container would then be sent to a filling device which would deposit the desired contents in the containers, whereupon they would be delivered to a second packaging machine wherein the remaining ends of the containers would be closed and sealed. While a continuous production line could be established by interposing a container filling station between two sets of packaging apparatus each comprising container feeding mechanism and container closing and sealing mechanism, such arrangement required a duplication of apparatus which was a substantial expense to the packager.

RESUME OF THE INVENTION

In contrast to the foregoing, the instant invention contemplates an integrated packaging system in which both ends of the containers may be closed and sealed utilizing a single closing and sealing mechanism having an even number of carriages alternately adapted to receive empty containers which are to be closed and sealed at one end and filled containers which are to be closed and sealed at their opposite ends. Similarly, a single transfer or feeding mechanism is employed to alternately feed either empty or filled containers to the closing and sealing means, the feeding means being in the form of a turret having an equal number of stations alternate ones of which are adapted to engage and remove flat carton blanks from an overlying feed hopper, erect the blanks and present the open-ended carton structures to the appropriate carriages forming a part of the closing and sealing apparatus. The remainder of the turret stations are adapted to receive cartons which have been previously closed and sealed at one end and filled with contents and deliver them to the remaining carriages for final closing and sealing. The system also includes conveyor means arranged to receive the sealed at one end only containers and deliver them to a filling station at which they are filled, whereupon the filled containers are returned by a transfer conveyor to the feeding turret for return to the closing and sealing apparatus. Upon the closing and sealing of the remaining ends of the filled containers, the completed packages are automatically delivered to a discharge conveyor for discharge from the system.

The container feeding turret is driven in timed relation to the flap closing and sealing mechanism and embodies suction means mounted on pivoting arms which engage and withdraw flat-folded containers from the overlying hopper. The alternate stations are equipped with suction means which receive and position filled containers received from the transfer conveyor which is also driven in timed relation to the movement of the turret. The delivery conveyor which feeds the transfer conveyor is provided with timed feeding means acting to release the filled containers one at a time in spaced apart relation for delivery to the turret feeding mechanism. The turret feeding mechanism also incorporates synchronized mechanism for erecting the flat-folded carton blanks and for assuring positive engagement and alignment of both empty and filled containers as they are presented to the carriages of the closing and sealing apparatus, the turret also including timed container discharge means for inserting the containers into the jaws of the carriages by means of which they are conveyed through the various stations which close and seal the ends of the containers.

THE DRAWINGS

Reference is made to the accompanying drawings wherein:

FIGURE 1 is a schematic plan view of a packaging system in accordance with the instant invention.

FIGURE 2 is a perspective view of the packaging apparatus with the container feeding turret in the foreground.

FIGURE 3 is a perspective view of the packaging apparatus with the delivery conveyor in the foreground.

FIGURE 4 is an enlarged fragmentary perspective view illustrating the transfer of filled containers from the transfer conveyor to alternate stations of the turret.

FIGURE 5 is an enlarged fragmentary perspective view illustrating the manner in which the filled containers are advanced along the transfer conveyor and also illustrating one of the pivoted suction arms which is utilized to withdraw flat-folded carton blanks from the overlying hopper.

FIGURE 6 is a fragmentary perspective view illustrating the presentation of an unfilled container to the carriage on which it is to be deposited.

FIGURE 7 is a fragmentary perspective view similar to FIGURE 6 but illustrating the discharge of a filled carton from the turret onto the coacting carriage.

FIGURE 8 is a fragmentary end elevational view with parts broken away illustrating certain components of the turret mechanism.

FIGURE 9 is a fragmentary plan view illustrating the pivoted suction means for withdrawing flat-folded container from the feed hopper.

FIGURE 10 is a fragmentary side elevational view of the cam means for actuating the various components of the turret.

FIGURE 11 is a fragmentary side elevational view of one of the alternate turret stations for receiving and erecting flat-folded container blanks upon withdrawal from the feed hopper.

FIGURE 12 is a fragmentary side elevational view illustrating one of the stations on the turret adapted to receive and position filled containers delivered to the turret from the transfer conveyor.

FIGURE 13 is a fragmentary plan view of the transfer conveyor which also illustrates the timing mechanism for delivering the filled containers to the transfer conveyor one at a time.

FIGURE 14 is an enlarged fragmentary plan view of the timing means.

DESCRIPTION OF THE PREFERRED EMBODIMENT

Reference is first made to FIGURE 1 of the drawings which schematically illustrates the general organization and operating sequence of the system.

General organization

Flat-folded container blanks which are to be erected, filled, and sealed, are initially deposited in a hopper 1 which overlies the periphery of the rotatable turret 2 mounted on a supporting base 3. The turret mounts an even number of container receiving stations 4 and 5 arranged in alternate relation, the stations 4 being adapted to receive and erect flat-folded carton blanks withdrawn from the hopper 1, whereas the stations 5 are adapted to receive filled containers from the transfer conveyor 6.

The container closing and filling apparatus, indicated generally at 7 is provided with a continuous series of carriages 8 and 9 which are also in alternate arrangement, the carriages 8 being adapted to coincide with and receive erected but unclosed containers from the turret stations 4, whereas the carriages 9 are adapted to receive the filled and sealed at one end containers from the turret stations 5. In this connection, the turret mounting the stations 4 and 5 rotates in the direction of the arrows A, and the sets of carriages 8 and 9 move in a path of travel indicated by the arrows B.

As the containers are advanced by the sets of carriages 8 and 9 their uppermost ends will be acted upon by folding and gluing mechanism which closes and seals their end closure flaps. Usually the containers will include tubular liners the mouths of which are also closed, sealed and infolded as an incident of the folding and sealing of the end closure flaps. The containers from both sets of carriages are discharged at a discharge station 10 which deposits the containers on a conveyor 11 along which they are advanced. A timed kicker mechanism 12 permits the unfilled containers to continue in their path of travel along conveyor 11, whereas the filled and sealed containers are contacted by the kicker 12 and pushed onto the discharge conveyor 13 for delivery to a collection station for packing in units for shipment and storage. The unfilled containers remaining on conveyor 11 are delivered to a filling station 14 at which the contents are introduced into the containers. The filling equipment does not constitute a limitation on the invention and filling station 14 may comprise any known type of filling apparatus which will introduce measured increments of contents into the containers as they are advanced through the device.

Upon discharge from the filling station 14, the now filled containers are deposited on a delivery conveyor 15 which delivers them to the transfer conveyor 6 for return to the container receiving stations 5, the containers being collected and metered to the transfer conveyor 6 by means of the timing means 16 which acts to release the containers one at a time in spaced apart relation for engagement by the transfer conveyor.

As should now be apparent, a single alternate station feed turret 2 and a single closing and sealing apparatus 7 are effectively utilized to convert the flat-folded containers into completely closed and sealed packages without the duplication of equipment which would otherwise be required.

The container feeding turret

As possibly best seen in FIGURE 8, the hopper 1 which positions a stack of flat-folded containers for delivery to the stations 4 of the turret 2, is mounted on a bracket means 20 supported by post 21 extending upwardly from supporting base 3, the opposite end of the bracket means being supported by an arm 22 secured to the vertical center post 23 which defines the axis of rotation of the turret. The post 23 also mounts a spider, one arm of which is indicated at 24, the spider mounting a circular safety screen 25.

The center post 23 is hollow and non-rotatably mounted on the supporting base 3 which defines the top of a housing 26 containing the drive mechanism for various components of the system. Such mechanism includes a gear box 27 driven by a drive shaft 28 which, as will be seen in FIGURE 3, projects outwardly from the rear of housing 26 where it is operatively connected through drive means 29 to a prime mover 30 which also powers the closing and sealing apparatus 7.

Referring again to FIGURE 8, the gear box includes an upwardly projecting shaft 31 mounting a gear 32 which is in meshing engagement with a gear 33 secured to a rotatable sleeve 34 surrounding the center post 23, the sleeve 34 being secured at its upper end to the base plate 35 of the turret 2, the turret also having a top plate 36 interconnected with the bottom plate by means of spaced apart posts 37 several of which are illustrated. A bearing assembly 38 rotatably mounts the top plate for rotating movement about the center post 23. As should now be evident, the turret 2 rotates about the center post 23 and is driven from the gear box 27.

The housing 26 also mounts a vacuum pump 39 driven by a prime mover 40, the vacuum pump having a conduit 41 connecting it to the lowermost end of the center post 23 which has a hollow bore extending therethrough, the hollow bore being connected toward the upper end of the center post to a rotary fitting 42 which, as will be explained more fully hereinafter, provides a source of vacuum for the vacuum cups forming a part of the container receiving stations 4 and 5.

As possibly best seen in FIGURES 10 and 11, each of the empty container receiving stations 4 includes one of the posts 37 which mounts a carton rest 43 and a U-shaped bracket 44. The station also includes a vacuum head 45 mounting a plurality of vacuum cups 46 connected through a suitable conduit 47 (FIGURE 10) to the rotary fitting 42. Adjacent the vacuum head 45 is a rotatable shaft 48 journaled at its lower end on base plate 35 and at its upper end to top plate 36. The shaft 48 mounts a folding plate 49 which, when rotated by the shaft 48, acts to erect the flat-folded cartons in a manner which will be hereinafter described.

With reference to FIGURES 9 and 10, each of the empty carton receiving stations 4 also includes a tubular vacuum arm 50 mounting a plurality of vacuum cups 51, the inner end of the arm being connected to a hollow shaft 52 pivotally journaled between trunnions 53. A conduit 54 connects the vacuum arm to the rotary fitting 42.

The vacuum arm is movable from the horizontally disposed position illustrated in FIGURES 9 and 10 to a vertical position in which the vacuum arm lies between the carton rest 43 and the vacuum head 45. Pivoting movement of the vacuum arm is obtained by means of the link member 55 connected at one end to the hollow shaft 52 and at its opposite end to a lever 56 mounted on a shaft 57 projecting downwardly through the top plate 36 where an oppositely directed lever 58 mounts a cam follower 59 which contacts annular cam 60 surrounding and fixedly secured to center post 23. A spring 61 acts through levers 56 and 58 to bias the cam follower 59 into contact with the cam 60. The cam follower assembly just described rotates with the top plate 36 of the turret and the configuration of cam 60 will be such that the vacuum arm will be pivoted from the vertical to the horizontal position as the container receiving station 4 approaches the hopper 1, an intermediate position of one of the vacuum arms being illustrated in FIGURE 5.

As seen in FIGURE 9, the top plate 36 also mounts an arm 62 projecting outwardly to the rear of the vacuum arm 50, the arm 62 mounting a finger-like mechanism 63 of known configuration positioned to engage the lowermost container in the hopper 1 and push it from beneath the hopper. In this connection, and again with reference to FIGURE 8, the hopper is provided with a tripping mechanism 64, also of known construction, which serves to separate the lowermost container in the hopper from the overlying ones, thereby facilitating its removal from the stack.

Thus, as each of the container receiving stations 4 approaches beneath the hopper 1, its vacuum arm 50 will pivot upwardly and the vacuum cups 51 will engage the undersurface of the lowermost flat-folded container in the stack. Concurrently, the finger-like mechanism 63 pushes the lowermost container from the hopper as the turret rotates. Once the container has cleared the hopper, the vacuum arm will pivot downwardly under the influence of cam 60 so as to juxtapose the container to the carton rest 43 and the vacuum head 45, the latter serving to hold the rearmost wall of the container firmly in place. Just as soon as the rearmost wall of the still flat-folded container has been engaged by the vacuum head 45, the vacuum to the vacuum arm 50 will be shut off, thereby releasing the arm from engagement with the front wall of the container, whereupon the cam 60 will act to pivot the arm upwardly to its horizontal position. To this end, the fitting 42 may be provided with suitable ports to open and close the several vacuum conduits to the flow of air therethrough in timed relation to the rotational movement of the turret.

At the time the still flat-folded container blank is juxtaposed to the carton rest 43, its positioning will be such that one of its narrower walls overlies the folding plate 49 which, at the time the container is received, projects outwardly in generally parallel relation to the carton rest 43, as may be seen in FIGURE 5. Once the container is in position on the rest, the shaft 48 is rotated to move the folding plate 49 forwardly, such movement serving to erect the body walls of the flat-folded container blank. Such movement is illustrated in FIGURE 4, wherein it will be seen that the container 65 is being erected or squared-up by the movement of the folding plate 49. Since the wide rearmost wall of the container is firmly engaged by the vacuum head 45, the container is securely held in place during the erecting operation.

The manner in which the shaft 48 rotates is illustrated in FIGURES 9 and 10 wherein it will be seen that the shaft 48 mounts a gear 66 adjacent its upper end which meshes with a larger gear 67 rotatable on stub shaft 68 secured to the undersurface of top plate 36. A lever arm 69 is fixedly secured to gear 67 so that movement of the arm 69 will cause the gear 67 to rotate. The arm 69 has a depending extension 70 mounting a cam follower 71 which contacts an annular cam 72 secured to center post 23, the configuration of the cam being such that the lever arm will be moved to thereby rotate the gears and hence shaft 48 in accordance with the rotative position of the turret. A spring 73 biases the lever arm 69 so as to maintain the cam followers 71 in contact with the cam 72 at all times.

As the turret continued to rotate, the folding plate 49 continues its folding movement and, as seen at 65a in FIGURE 6, actually folds the carton beyond the fully erected condition, i.e., it overfolds the carton, thereby breaking the score lines sufficiently so that the body walls will lie at essentially right angles to each other as the container is fed to the carriage which conveys it through the various folding and gluing stations.

One of the container receiving stations 5 which receive filled containers from the transfer conveyor 6 is illustrated in FIGURE 12. It comprises a carton rest 74 attached to a post 37, the rest including a platform 75 on which the sealed bottoms of the filled containers are seated. A vacuum head 76 acts to engage the rear walls of the containers and hold them in position on the carton rest and platform. The rotatable shaft 48 mounts a clamping plate 77 which pivots forwardly and engages the containers as they are presented by the transfer conveyor 6 to the receiving stations 5.

As can be seen in FIGURES 4 and 13, the transfer conveyor 6 is provided with resiliently mounted fingers 78 which act to engage the leading ends of tne filled containers and position them for contact by the clamping plate 77. As the clamping plate engages the trailing wall of the container, the fingers act to urge the container onto the platform 75 and hence in engagement with the rest 74 and vacuum head 76.

Pivoting movement of clamping plates 77 is obtained in the same manner as folding plates 49, i.e., through gears 66 and 67 and interconnecting linkage mechanism terminating in a cam follower 71a shown in dotted lines in FIGURE 10, which replaced the cam follower 71. The cam follower 71a contacts a cam 72a mounted on center post 23, the configuration of cam 72a being such as to rotate the clamping plate 77 forwardly for engagement with the containers as they are delivered to the stations 5 by the transfer conveyor 6.

Containers from both the stations 4 and 5 are discharged onto the sets of carriages 8 and 9 by pusher mechanism which thrusts the containers into the jaws of the carriages. Thus, as seen in FIGURE 6, each of the carriages is provided with an upper set of jaws 79 and a lower set of jaws 80 which are cam actuated and timed to close as the containers are presented to the carriages. For details of the construction and operation of the carriages reference is made to Bergstein et al. U.S. Patent 2,443,293. It will be understood that the sets of carriages 8 and 9 will be adjusted to accommodate unsealed and sealed at one end containers, respectively.

The containers are ejected from the container receiver stations 4 and 5 by means of the vacuum heads 45 and 76, respectively, which are plunger mounted and arranged to be projected forwardly and retracted as the containers are advanced into alignment with the carriages. Thus, as seen in FIGURE 10, each of the suction heads is provided with a rearwardly projecting slide shaft 85 slidably received in a mounting bracket 86 mounted on a housing 87 having an axial bore through which a plunger 88 extends, the forward end of the plunger being secured to the vacuum head by means of a fitting 89 to which a link 90 is also secured. At its opposite end the link 90 is connected to one end of a lever arm 91 the opposite ends of which is pivoted to a stud 92, the lever arm also mounting a cam follower 93 which engages the annular cam 94 secured to center post 23. The configuration of cam 94 is such that it will thrust the plunger 88 forwardly against the tension of spring 95 as the container receiving stations come into alignment with the carriages. At the same time, the vacuum drawn on the vacuum heads will be cut off and, as seen in FIGURE 7, the container is thrust forwardly onto the carriage where the sets of jaws 79 and 80 close about its opposite side edges. The containers are thus transferred to the closing and sealing apparatus. The configuration of the cam 94 is such that the vacuum heads will be retracted under the influence of springs 95, thereby returning the parts to the condition to receive another container either from the feed hopper or from the transfer conveyor, as the case may be.

The closing and sealing apparatus

The closing and sealing apparatus as such does not constitute a limitation on the invention and, in the embodiment illustrated, is of the type generally disclosed in Bergstein et al. U.S. Patent 2,979,995 to which reference is hereby made for details of its construction.

Generally speaking, and with reference to FIGURE 3 of the drawings, the containers are successively presented to a station indicated at A wherein the mouth of each liner is expanded so as to flatten its opposite side edges, whereupon the extending end of the liner is heat sealed and folded as it passes through the station indicated generally at B. The container then enters an arcuate section of the machine, indicated at C, wherein flap folding mechanism acts to infold the leading and trailing flaps, the liner end also being infolded, whereupon the container proceeds along the opposite side of the machine where adhesive is applied to the remaining closure flaps and the flaps infolded and sealed. These latter operations take place at the station indicated generally at D in FIGURE 2, whereupon the cages are opened and the containers, whether empty or filled, are ejected into a chute 96 which deposits them on the conveyor 11 which is also driven in timed relation to the movement of the closing and sealing apparatus by means of gearing indicated generally at 97. It will be understood that the containers moving along the conveyor 11 are alternately empty and filled. The filled containers, which are now completely sealed, are acted upon by the timed kicker mechanism 12 (FIGURE 1) which deposits them into chute 98 seen in FIGURE 2 which guides them onto the discharge conveyor 13 which may be powered by its own prime mover 99.

The unfilled containers continue along conveyor 11 to the filling station 14 and thence to delivery conveyor 15 which returns the now filled containers to transfer conveyor 6.

The transfer and delivery conveyors

The motive power for the transfer conveyor 6 is provided by the drive shaft 100 which, as seen in FIGURE 8, is driven from gear box 27 through chain 101, gearing 102 and coupling 103. The transfer conveyor is thus driven in timed relation to the rotation of the turret. Containers entering the transfer conveyor are advanced along a slide bar 104 by means of an endless chain 105 carrying container engaging lugs 106, the chain passing ground sprockets 107 and 108 the latter of which is mounted on drive shaft 100. With this arrangement, the transfer conveyor will time the delivery of the containers to the movement of the container receiving stations 4 and 5.

In order to insure that a container will be present to be engaged by each succeeding lug 106, the timing means 16 at the discharge end of delivery conveyor 15 is utilized to meter the cartons to the transfer conveyor. As seen in FIGURE 14, the timing means 16 comprises an elongated arm 110 having a finger 111 at one end and a pad 112 at its opposite end, the arm being pivoted at 113 for movement from the position illustrated in solid lines to the position illustrated in dotted lines. Movement of the arm from one position to the other is controlled by pneumatic cylinder 114 operatively connected to the arm 110, the arm being normally biased to the position illustrated in dotted lines by means of the spring 115, adjustment of the alternate positions of the arm being obtained by means of adjustable stops 116 and 117.

Actuation of the cylinder 114 is controlled by the switch mechanism 118 seen in FIGURE 13 which includes a switch arm 119 mounting a cam follower 120 which contacts cam 121 driven in timed relation to conveyor chain 105 by means of chain 122 and sprocket 123. The conveyor 15, on the other hand, need not be driven in timed relation to the transfer conveyor and may be driven by means of the motor 124 and gearing 125 seen in FIGURE 3. A plurality of containers thus may be accumulated on conveyor 15 if so desired. Their advance to the transfer conveyor 6 will, however, be arrested by the finger 111 of the timing means 16. When the finger 111 is retracted upon pivoting movement of the arm 110, the leading container abutting the finger will be released and, by reason of the timing cam 121, the released container will enter the transfer conveyor just in advance of one of the lugs 106 which engages the trailing wall of the container and advances it along the slide bar 104. Retracting movement of the finger 111 to release the leading container on conver 15 also serves to thrust the pad 112 at the opposite end of arm 110 forwardly where it engages and clamps the next succeeding container on conveyor 15 against the side guide 122 seen in FIGURE 14. Thus, the timing means 16 simultaneouly releases the leading container and yet positively engages the next succeeding container to prevent the accidental discharge of two containers at the same time. When the arm 110 is released to return the finger 111 to its forward position, the pad 112 will retract and hence the container clamped by the pad will be released and will advance into contact with the finger 111 and hence be positioned for release to the transfer conveyor in timed relation to the approach of the next succeeding lug 106.

As should now be apparent, the instant invention provides a completely integrated packaging system in which flat-folded container structures are converted into filled and sealed packages in a continuous operation wherein a single transfer means and a single closing and sealing unit is arranged to alternately handle empty and filled containers. Modifications may, of course, be made in the invention without departing from its spirit and purpose. Various modifications have been set forth in the specification and others will be obvious to the skilled worker in the art, and it is not intended that the invention be limited other than in the manner set forth in the claims which follow.

The embodiments of the invention in which an exclusive property or privilege is claimed are defined as follows:

1. In a packaging system for alternately closing and sealing both empty and filled containers, the combination of:
    (a) a single rotatable turret having an even number of stations alternate ones of which are adapted to receive empty containers which are unclosed and unsealed at both ends and the remainder filled containers which are unclosed and unsealed at one end only,
    (b) a single container closing and sealing apparatus adjoining said turret, said closing and sealing apparatus including an even number of container receiving carriages movable in a continuous path of travel through a series of stations including a container transferring station, a container discharge station, and a plurality of intermediate stations for closing and sealing the ends of the containers presented thereto,
    (c) means for driving said turret and said carriages in timed relation, said turret being positioned to alternately present unfilled and filled containers to successive carriages as said carriages reach said container transferring station, and means at each station on said turret for transferring the containers from said turret to said carriages,
    (d) means at said discharge station for discharging the containers from said carriages, and a conveyor positioned to receive the discharge containers and convey the unfilled containers only to a container filling station, including means for diverting filled and sealed containers away from the filling station,
    (e) a delivery conveyor for receiving filled containers from the filling station and delivering them to a transfer conveyor, and
    (f) a transfer conveyor having its discharge end positioned adjacent said turret, said transfer conveyor including timing means for delivering filled containers to the filled container stations only of said turret.

2. The packaging system claimed in claim 1 including metering means for delivering filled containers from said delivery conveyor to said transfer conveyor in timed relation to the movement of said timing means.

3. The packaging system claimed in claim 2 wherein said timing means includes an endless timing chain mounting spaced apart container contacting lugs, said chain being driven in timed relation to the rotation of said turret.

4. The packaging system claimed in claim 3 wherein said metering means comprises an elongated arm having a container engaging finger at one end and a pad at its opposite end, said arm being pivotally movable from a first position in which said finger engages the leading end of a first container advancing along said delivery conveyor adjacent said transfer conveyor, to a second position in which said finger is retracted to free said first container for movement onto said transfer conveyor and said pad engages the next succeeding container on said delivery conveyor to arrest its forward movements, and means operative to move said arm from one position to the other in timed relation to the movement of said timing chain.

5. The packaging system claimed in claim 1 wherein said transfer conveyor mounts resilient finger means at its discharge end positioned to engage and align the filled containers relative to the filled container stations of the turret, the filled container stations of the turret each including a container supporting platform and means coacting with said resilient finger means to deposit filled containers on said platform.

6. The packaging system claimed in claim 5 wherein the means coacting with said resilient finger means comprises a movable clamping plate adapted to engage the trailing wall of each container presented to the filled container station.

7. The packaging system claimed in claim 6 wherein each of the filled container receiving stations includes a vacuum head for engaging and holding containers presented thereto.

8. The packaging system claimed in claim 1 wherein a hopper for flat-folded containers overlies said turret, wherein the empty container receiving stations of said turret each includes a carton rest and means for removing flat-folded containers from said hopper and depositing them on said carton rest, together with means for erecting the body walls of said flat-folded containers while in engagement with said carton rest.

9. The packaging system claimed in claim 8 wherein the means for removing containers from said hopper includes a pivotally mounted arm movable in timed relation to the movement of the turret from a horizontal position in which said arm is juxtaposed to the undersurface of said hopper to a vertical position adjacent said carton rest, said arm including vacuum means engageable with said containers.

10. The packaging system claimed in claim 1 wherein the means at each station on the turret for transferring containers from the turret to the carriages comprises a vacuum head, and means mounting said vacuum head for movement from a rearward container receiving position to a forward container discharging position, said vacuum head mounting means including actuating means for moving said vacuum head from one position to the other in timed relation to the rotation of said turret.

11. A method for concurrently closing and sealing the ends of both empty and filled containers which comprises the steps of:

(a) providing a single container closing and sealing device having an even number of carriages adapted to convey the containers through a series of folding and sealing stations effective to close and seal the closure flap at one end of each container, the closing and sealing device having a container transferring station and a container discharge station.

(b) positioning a single rotatable turret having an even number of container receiving stations adjacent the container transferring station of said container closing and sealing device, (c) driving said carriages and said turret in timed relation to each other so that successive container receiving stations on said turret will be presented to successive carriages at the container transferring station of said closing and sealing device, (d) feeding unfilled and unsealed containers from a source of supply to alternate container receiving stations on said turret, (e) transferring the unfilled and unsealed containers to alternate carriages of said closing and sealing device, and closing and sealing one end of each such container, (f) discharging the said containers from the carton closing and sealing device and conveying them to a filling station, (g) filling the said containes and returning the filled containers to said turret, including the step of feeding the filled containers to the remaining container receiving stations on said turret in timed relation to the movement thereof, (h) transferring the filled containers from the turret to the remaining carriages on the container closing and sealing device and closing and sealing the remaining ends of the filled containers, and (i) discharging the filled containers from the container closing and sealing device, including the step of separating the filled containers from the unfilled containers being delivered to the filling station.

12. The process claimed in claim 11 including the step of feeding the unfilled and unsealed containers to the container receiving stations in flat-folded condition, and erecting said flat-folded containers while carried by said turret.

13. The method claimed in claim 12 including the step of folding the walls of said containers beyond their fully erected condition to thereby over-break their scorelines.

References Cited

UNITED STATES PATENTS

| | | | |
|---|---|---|---|
| 2,141,525 | 12/1938 | Ferguson | 53—284 X |
| 2,757,988 | 8/1956 | Meyer-Jagenberg et al. | 53—186 |
| 3,353,328 | 11/1967 | Wheeler et al. | 53—284 X |

THERON E. CONDON, Primary Examiner

R. L. SPRUILL, Assistant Examiner

U.S. Cl. X.R.

52—37, 168, 186, 284